(12) United States Patent
Harrington et al.

(10) Patent No.: US 12,283,159 B2
(45) Date of Patent: *Apr. 22, 2025

(54) SYSTEM AND METHOD FOR DYNAMICALLY ADJUSTING PRIZES OR AWARDS BASED ON A PLATFORM

(71) Applicant: Kabam, Inc., San Francisco, CA (US)

(72) Inventors: Clifford J. Harrington, San Francisco, CA (US); Kent Wakeford, Hillsborough, CA (US)

(73) Assignee: Kabam, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/537,630

(22) Filed: Dec. 12, 2023

(65) Prior Publication Data

US 2024/0127670 A1    Apr. 18, 2024

Related U.S. Application Data

(63) Continuation of application No. 17/706,330, filed on Mar. 28, 2022, now Pat. No. 11,847,887, which is a continuation of application No. 16/833,260, filed on Mar. 27, 2020, now Pat. No. 11,308,759, which is a continuation of application No. 16/160,588, filed on Oct. 15, 2018, now Pat. No. 10,629,029, which is a continuation of application No. 15/916,056, filed on Mar. 8, 2018, now Pat. No. 10,127,769, which is a continuation of application No. 15/665,136, filed on
(Continued)

(51) Int. Cl.
*A63F 13/00*  (2014.01)
*A63F 13/25*  (2014.01)
*A63F 13/30*  (2014.01)
*A63F 13/335* (2014.01)
*A63F 13/79*  (2014.01)
*A63F 13/792* (2014.01)
*A63F 13/795* (2014.01)
*A63F 13/92*  (2014.01)
*G07F 17/32*  (2006.01)

(52) U.S. Cl.
CPC .......... *G07F 17/3244* (2013.01); *A63F 13/25* (2014.09); *A63F 13/30* (2014.09); *A63F 13/335* (2014.09); *A63F 13/79* (2014.09); *A63F 13/792* (2014.09); *A63F 13/795* (2014.09); *A63F 13/92* (2014.09)

(58) Field of Classification Search
CPC ........ A63F 13/00; A63F 13/25; A63F 13/335; A63F 13/30; A63F 13/79; A63F 2300/20; A63F 2300/40
USPC .......................................................... 463/25
See application file for complete search history.

(56) References Cited

U.S. PATENT DOCUMENTS

6,527,641 B1 * 3/2003 Sinclair .................. A63F 13/79
                                                          463/40
6,896,618 B2 * 5/2005 Benoy ................. G07F 17/3211
                                                          463/25
(Continued)

*Primary Examiner* — Michael A Cuff
(74) *Attorney, Agent, or Firm* — Esplin & Associates, PC (57) ABSTRACT

One aspect of the disclosure relates to implementing a system to encourage cross platform operation in an online game. The online game may provide the ability to provide incentives for participating in cross platform game play. The system may monitor the player's performance on a particular console and provide incentives to accomplish tasks through game play on a different platform than the player is currently operating to play the game.

20 Claims, 8 Drawing Sheets

Related U.S. Application Data

Jul. 31, 2017, now Pat. No. 9,959,705, which is a continuation of application No. 15/224,899, filed on Aug. 1, 2016, now Pat. No. 9,721,431, which is a continuation of application No. 13/929,677, filed on Jun. 27, 2013, now Pat. No. 9,403,093.

(56) References Cited

U.S. PATENT DOCUMENTS

| | | | | |
|---|---|---|---|---|
| 6,913,536 B2* | 7/2005 | Tomizawa | A63F 13/45 | 463/31 |
| 7,054,830 B1* | 5/2006 | Eggleston | G06Q 30/0225 | 705/14.39 |
| 7,713,118 B2* | 5/2010 | Roemer | G07F 17/3269 | 463/16 |
| 8,147,328 B2* | 4/2012 | Carroll | A63F 13/87 | 463/40 |
| 8,246,466 B2* | 8/2012 | Herrmann | G07F 17/32 | 463/31 |
| 8,255,297 B2* | 8/2012 | Morgenstern | G06Q 30/00 | 705/26.1 |
| 8,287,383 B1* | 10/2012 | Etter | A63F 13/5378 | 463/42 |
| 8,296,781 B1* | 10/2012 | Lebaredian | G06F 9/44505 | 700/28 |
| 8,348,747 B2* | 1/2013 | Arezina | G07F 17/3211 | 463/20 |
| 8,388,452 B2* | 3/2013 | Auterio | G07F 17/32 | 705/14.12 |
| 8,527,332 B2* | 9/2013 | Selby | G06Q 30/0254 | 705/14.1 |
| 8,944,908 B1* | 2/2015 | Wakeford | A63F 13/358 | 463/23 |
| 2002/0158917 A1* | 10/2002 | Sinclair | A63F 13/12 | 715/850 |
| 2003/0119576 A1* | 6/2003 | McClintic | G07F 17/32 | 463/20 |
| 2003/0119581 A1* | 6/2003 | Cannon | G07F 17/32 | 463/25 |
| 2003/0211889 A1* | 11/2003 | Walker | G07F 17/3255 | 463/42 |
| 2004/0249712 A1* | 12/2004 | Brown | G06Q 30/0217 | 705/14.19 |
| 2005/0054439 A1* | 3/2005 | Rowe | G07F 17/3255 | 463/29 |
| 2005/0076002 A1* | 4/2005 | Williams | G06F 9/44505 | |
| 2005/0113164 A1* | 5/2005 | Buecheler | G07F 17/3239 | 463/23 |
| 2005/0192097 A1* | 9/2005 | Farnham | A63F 13/335 | 463/42 |
| 2006/0105838 A1* | 5/2006 | Mullen | A63F 13/525 | 463/31 |
| 2007/0004496 A1* | 1/2007 | Gordon | A63F 3/062 | 463/19 |
| 2007/0066403 A1* | 3/2007 | Conkwright | A63F 13/803 | 463/43 |
| 2008/0182664 A1* | 7/2008 | Kaplan | G07F 17/3274 | 463/42 |
| 2008/0200244 A1* | 8/2008 | Rowe | G07F 17/32 | 463/27 |
| 2008/0234034 A1* | 9/2008 | Tessmer | G07F 17/3244 | 463/21 |
| 2008/0266250 A1* | 10/2008 | Jacob | A63F 13/67 | 345/156 |
| 2008/0293466 A1* | 11/2008 | Arakawa | A63F 13/85 | 463/7 |
| 2008/0300055 A1* | 12/2008 | Lutnick | G07F 17/32 | 463/39 |
| 2008/0318668 A1* | 12/2008 | Ching | G07F 17/3258 | 463/25 |
| 2009/0051114 A1* | 2/2009 | Robbers | A63F 1/00 | 273/293 |
| 2009/0077463 A1* | 3/2009 | Koster | A63F 13/12 | 715/234 |
| 2009/0181771 A1* | 7/2009 | Sogabe | A63F 13/69 | 463/43 |
| 2009/0181774 A1* | 7/2009 | Ratcliff | A63F 13/12 | 463/42 |
| 2009/0318232 A1* | 12/2009 | Harris | A63F 13/67 | 370/310 |
| 2010/0056243 A1* | 3/2010 | Czyzewski | G07F 17/3295 | 463/16 |
| 2010/0144424 A1* | 6/2010 | Rogers | A63F 13/67 | 463/30 |
| 2010/0166065 A1* | 7/2010 | Perlman | H04N 21/658 | 375/E7.173 |
| 2010/0273557 A1* | 10/2010 | Miyaki | H04L 12/145 | 463/42 |
| 2010/0279762 A1* | 11/2010 | Sohn | A63F 13/58 | 463/23 |
| 2010/0304839 A1* | 12/2010 | Johnson | A63F 13/67 | 463/43 |
| 2011/0093361 A1* | 4/2011 | Morales | G06Q 30/0603 | 705/26.62 |
| 2011/0106607 A1* | 5/2011 | Alfonso | G06Q 30/02 | 705/35 |
| 2011/0312423 A1* | 12/2011 | Mosites | G06Q 30/0209 | 463/42 |
| 2012/0009997 A1* | 1/2012 | Youm | A63F 13/335 | 463/42 |
| 2012/0015742 A1* | 1/2012 | Vanbragt | A63F 13/85 | 463/42 |
| 2012/0129598 A1* | 5/2012 | Chao | G07F 17/3237 | 463/31 |
| 2012/0150695 A1* | 6/2012 | Fan | G06Q 30/02 | 705/27.1 |
| 2012/0172098 A1* | 7/2012 | Baker | G07F 17/3237 | 463/43 |
| 2012/0244948 A1* | 9/2012 | Dhillon | A63F 13/61 | 463/42 |
| 2012/0244950 A1* | 9/2012 | Braun | G07F 17/3244 | 463/42 |
| 2012/0290950 A1* | 11/2012 | Rapaport | H04L 12/1818 | 715/753 |
| 2012/0303425 A1* | 11/2012 | Katzin | G06Q 20/4016 | 705/16 |
| 2012/0322545 A1* | 12/2012 | Arnone | G07F 17/3286 | 463/25 |
| 2013/0005437 A1* | 1/2013 | Bethke | H04W 4/02 | 463/25 |
| 2013/0014033 A1* | 1/2013 | Hamick | G06Q 50/01 | 715/757 |
| 2013/0017870 A1* | 1/2013 | Parker | G06Q 30/02 | 463/1 |
| 2013/0066695 A1* | 3/2013 | Just | G06Q 30/02 | 705/14.16 |
| 2013/0079082 A1* | 3/2013 | Bancel | G07F 17/32 | 463/9 |
| 2013/0079145 A1* | 3/2013 | Lam | A63F 13/332 | 463/42 |
| 2013/0085838 A1* | 4/2013 | Tennenholtz | G06Q 50/01 | 705/14.41 |
| 2013/0130781 A1* | 5/2013 | Anderson | G07F 17/3244 | 463/25 |
| 2013/0184064 A1* | 7/2013 | Manning | G07F 17/32 | 463/32 |
| 2013/0203489 A1* | 8/2013 | Lyons | G07F 17/3209 | 463/30 |
| 2013/0324259 A1* | 12/2013 | McCaffrey | A63F 9/24 | 463/42 |
| 2014/0031129 A1* | 1/2014 | Morrison | A63F 13/44 | 463/42 |
| 2014/0080556 A1* | 3/2014 | Knutsson | A63F 13/92 | 463/7 |
| 2014/0122720 A1* | 5/2014 | Jung | H04L 41/5054 | 709/225 |
| 2014/0128161 A1* | 5/2014 | Latta | A63F 9/24 | 463/42 |

(56) References Cited

U.S. PATENT DOCUMENTS

| | | | |
|---|---|---|---|
| 2014/0274308 A1* | 9/2014 | Guinn | G07F 17/3244 |
| | | | 463/25 |
| 2014/0278686 A1* | 9/2014 | Mullings | G06Q 10/1097 |
| | | | 705/7.21 |
| 2014/0357344 A1* | 12/2014 | Grier | G07F 17/3223 |
| | | | 463/25 |
| 2014/0358651 A1* | 12/2014 | Koh | G06Q 20/065 |
| | | | 705/14.12 |
| 2015/0005052 A1* | 1/2015 | Harrington | A63F 13/335 |
| | | | 463/25 |
| 2015/0011277 A1* | 1/2015 | Wakeford | A63F 13/35 |
| | | | 463/1 |
| 2015/0170455 A1* | 6/2015 | Rad | G07F 17/323 |
| | | | 463/25 |

* cited by examiner

SYSTEM AND METHOD FOR DYNAMICALLY ADJUSTING PRIZES OR AWARDS BASED ON A PLATFORM

FIELD

The disclosure relates to dynamically adjusting prizes or awards based on a platform through which a player accesses an online game.

BACKGROUND

When engaging in various online games, players usually use only one platform. Thus, any information about the player's habits is usually limited to that singular platform. In some implementations, the platform the player operates may be very limiting in providing information about the player.

SUMMARY

One aspect of the disclosure relates to implementing a system to encourage cross platform operation in an online game. The online game may provide the ability to provide incentives for participating in cross platform game play. The system may monitor the player's performance on a particular console and provide incentives to accomplish tasks through game play on a different platform than the player is currently operating to play the game. This may provide a mechanism through which players are directed to the online game through a platform or platform that provide an enhanced in-game experience for an individual player, that enhances a player's ability to make purchases in and/or for the game, that enhances a conversion rate of purchases made by a player in the game, that enhances the user's engagement and/or usage session, and/or provides other enhancements. This mechanism may be relatively unobtrusive to users, while aligning benefits of the user on a platform-by-platform basis with the benefits of the online game provider.

A system configured to dynamically adjust prizes or awards based on a platform may include one or more processors configured to execute compute program modules. The program modules may comprise a game module, a user module, an interaction module, a relationship module, a network module, a user valuation module, a reward module, and/or any other modules.

The game module may be configured to execute a game instance of a game space. The game instance may be used to facilitate presentation of views of the game space to users. The game instance may be configured to facilitate interaction of the users with the game space and/or each other by performing operations in the game instance in response to commands and/or any other input received from the users. The users may include a first user that accesses the game through multiple game platforms including a first game platform and a second game platform and/or any other game platform. Game platforms include online services through which users access online games and/or other resources. The game platforms may provide authentication, social graph information, demographic information, and/or other information to the games and/or other resources. The game platforms may be accessed by users through websites and/or other online media. Examples of online game platforms include, for example, Facebook, battle.net, Twitter, zynga.com, Kabam.com, Google Plus, iTunes/iOS, Google Play, and/or other online platforms.

A user module may be configured to manage user profiles including user information related to participating in a game through multiple modules. The user information may include user information for the first user that describes interaction of the first user with the game through the first platform and the second platform and/or any other platform. User information may be stored in user accounts and/or profiles. User accounts may be an account on a video game central server or within a peer-to-peer network that contains a user profile including personal, billing, and character account information. A user attribute may be any attribute that can be applied to a user account. User attributes may include, but not be limited to: real currency, discount of monthly fees for playing game, monthly fee for playing a game, interest rates for use of or borrowing real or virtual cash amounts, global character attribute settings for all characters created by player across multiple games, rewards for encouraging another player to sign up to play and/or any other attributes.

A user valuation module may be configured to determine user value metrics for the users on the individual platforms. The user valuation module may determine a first user value metric for the first user on the first platform and a second user value metric for the first user on the second platform based on the user information stored in the user profiles.

The user valuation module may be configured to determine the user value metrics of the user on the various platforms through which the user may access the game. The metrics may include the first user value metric and the second user value metric and/or any other metric. The user valuation module may determine the user value metrics based on the past user spending and/or any other type of spending by the users on the platforms. The past user spending may comprise one or more of: virtual currency and real world currency and/or any other type of currency. The user valuation module may be configured such that the amount of the past user spending in the game may be monitored by one or more of: a spend velocity, a spend frequency, a total amount spent, conversion rates of the different platforms, monetization through ads on the different platforms, and/or other variables in addition to in game spending that impact value to the game provider.

A reward module may be configured to provide virtual rewards to users in the game responsive to users participating in or completing activities. The activities may include a first activity and/or any other activity. The reward module may determine responsive to the first user completing the first activity, a reward to provide the users based on the platform through which the user is accessing the game to perform the first activity and/or any other activity. The reward module may be configured to determine if the user completes the activities comprising one or more of: tasks in the game, logging into the game, interacting with other users in the game, inviting other people to join the game and/or activities.

The reward module may create an incentive for users to play on more than one platform. Many times users usually play games only one platform and the information about the user's habits is usually limited to that singular platform. By creating a mechanism to provide rewards to users outside the single platform, users will be incentivized to play on different game platforms. While users play on different game platforms, game administrators may monitor different types of user habits and behavior. The user habits and behavior may include spend behavior and user engagement all based on user input through each console. This will allow a game administrator to gain a better understanding of user habits and overall behavior. A user's habits and behavior may be captured not only when the user is traveling through their phone, but also when they are at home on their PC, when they are on their office PC, and/or when they are on their home console and/or any other platform.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
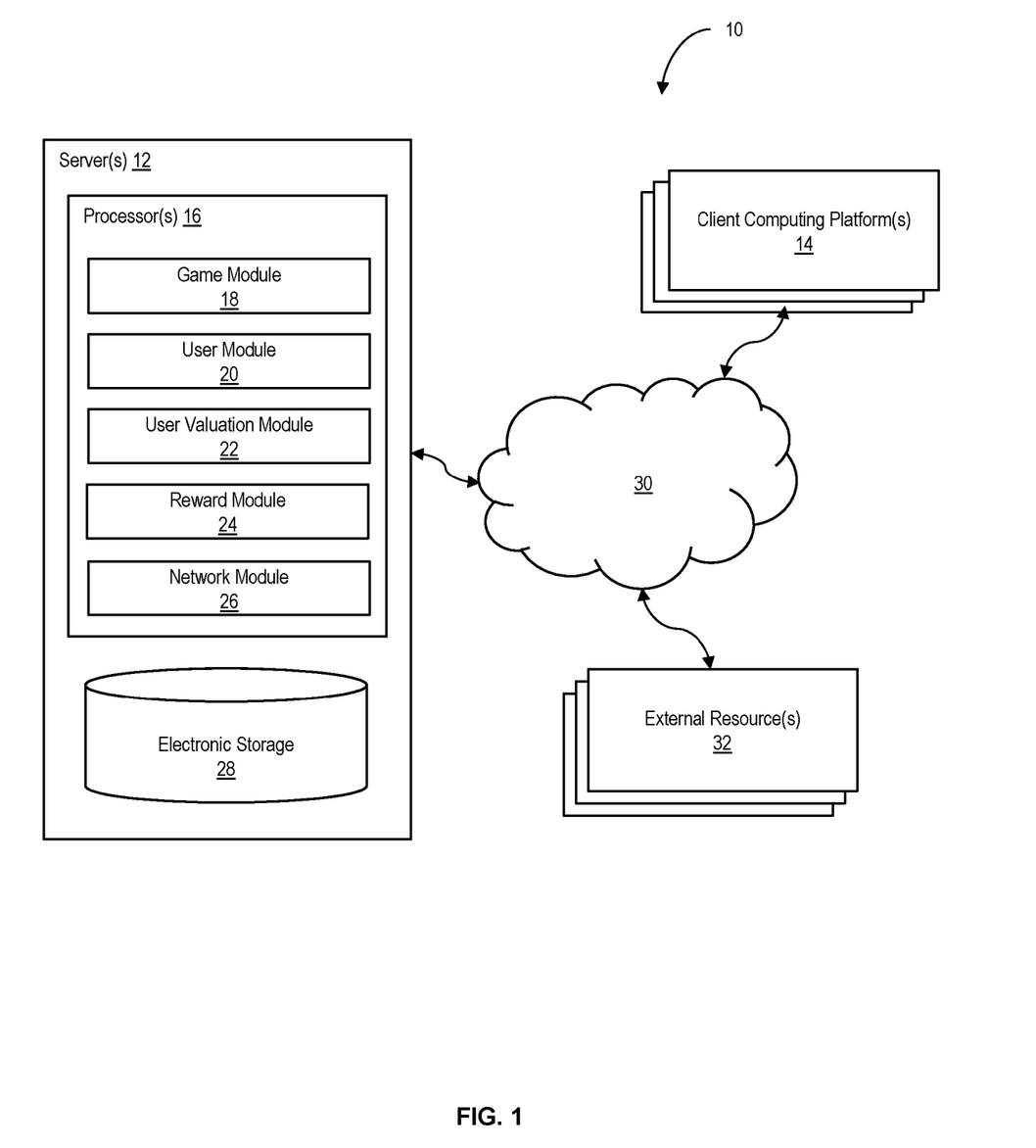
FIG. 1 illustrates an exemplary system configured to dynamically adjusting prizes or awards based on a platform in an online game, according to an aspect of the invention.

FIG. 1 illustrates a system 10 configured to dynamically adjust prizes or awards based on a platform in an online game, according to an aspect of the invention. The program modules may comprise a game module 18, a user module 20, an interaction module, a store module, a user valuation module 22, a reward module 24, a network module 26, and/or any other modules. In some implementations, system 10 may include a game server(s) 12. The game server(s) 12 may host a game space in which an online game takes place. The game server(s) 12 may be configured to communicate with one or more client computing platform(s) 14 according to a client/server architecture. The users may access system 10 and/or the game space via client computing platform(s) 14.

The game server(s) 12 may be configured to execute one or more computer program modules. The computer program modules may include one or more of a game module 18, a user module 20, an interaction module, a store module, a user valuation module 22, a reward module 24, a network module 26, and/or any other modules.

The game module 18 may be configured to execute a game instance of a game space. The game instance may be used to facilitate presentation of views of the game space to users. The game instance may be configured to facilitate interaction of the users with the game space and/or each other by performing operations in the game instance in response to commands and/or any other input received from the users. The users may include a first user that accesses the game through multiple game platforms including a first game platform and a second game platform and/or any other game platform. Platforms may include hardware platforms, operating system platforms and/or software platforms.

In some implementations, hardware platform may include different types of systems in general (e.g., mainframe, workstation, desktop, handheld and/or embedded) and/or the specific type of processor (e.g., x86, SPARC, PowerPC and/or Alpha). Game platforms may include online services through which users access online games and/or other resources. The game platforms may provide authentication, social graph information, demographic information, and/or other information to the games and/or other resources. The game platforms may be accessed by users through websites and/or other online media. Examples of online game platforms include, for example, Facebook, battle.net, Twitter, zynga.com, Kabam.com, Google Plus, iTunes/iOS, Google Play, and/or other online platforms.

The game module 18 may be configured to implement the instance of the game space executed by the computer modules to determine state of the game space. The state may then be communicated (e.g., via streaming visual data, via object/position data, and/or other state information) from server(s) 12 to client computing platforms 14 for presentation to users. The state determined and transmitted to a given client computing platform(s) 14 may correspond to a view for a user character being controlled by a user via the given client computing platform(s) 14. The state determined and transmitted to a given client computing platform(s) 14 may correspond to a location in the game space. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The instance of the game space may comprise a simulated space that is accessible by users via clients (e.g., client computing platforms 14) that present the views of the game space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which state of the game space is determined by game module 18 is not intended to be limiting. The game module 18 may be configured to express the game space in a more limited, or more rich, manner.

For example, views determined for the game space representing the state of the instance of the game space may be selected from a limited set of graphics depicting an event in a given place within the game space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the game space are contemplated.

Within the instance(s) of the game space executed by game module 18, users may control characters, objects, simulated physical phenomena (e.g., wind, rain, earthquakes, and/or other phenomena), and/or other elements within the game space to interact with the game space and/or each other. The user characters may include avatars. As used herein, the term "user character" may refer to an object (or group of objects) present in the game space that represents an individual user. The user character may be controlled by the user with which it is associated. The user controlled element(s) may move through and interact with the game space (e.g., non-user characters in the game space, other objects in the game space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the game space.

The users may participate in the instance of the game space by controlling one or more of the available user controlled elements in the game space. Control may be exercised through control inputs and/or commands input by the users through client computing platform(s) 14. The users may interact with each other through communications exchanged within the game space. Such communications may include one or more of textual chat, instant messages, private messages, voice communications, and/or other communications. Communications may be received and entered by the users via their respective client computing platform(s) 14.

Communications may be routed to and from the appropriate users through server(s) 12 (e.g., through game module 18).

The system may comprise a user module 20 configured to store inventories of virtual items that are available to users in the game space. The inventories may include a first inventory and/or any other inventory of virtual items available to a first user in the game space. The user module 20 may be configured to access and/or manage one or more user profiles and/or user information associated with users of the system 10. The one or more user profiles and/or user information may include information stored by game server(s) 12, one or more of the client computing platform(s) 14, and/or other storage locations. The user profiles may include, for example, information identifying users (e.g., a username or handle, a number, an identifier, and/or other identifying information) within the game space, security login information (e.g., a login code or password), game space account information, subscription information, virtual currency account information (e.g., related to currency held in credit for a user), relationship information (e.g., information related to relationships between users in the game space), game space usage information, demographic information associated with users, interaction history among users in the game space, information stated by users, purchase information of users, browsing history of users, a client computing platform identification associated with a user, a phone number associated with a user, and/or other information related to users.

The user module 20 may be configured to store inventories of virtual items including resources that are available to users in the game space. Various matters may be collected in an inventory. These matters may include, but are not limited to, virtual items, virtual resources, character attributes, character skills, and/or virtual currency. A virtual item may be an item that can be used in a virtual world to assist a player's character. Examples of virtual items include, but are not limited to, valuables (money, valuable metals or gems, etc.), weapons, spell components, defense components, and/or armor. A virtual resource may be a resource that can be used in the virtual world to create game attributes. Examples of virtual resources include wood, stone, herbs, water, ores, animals, monsters, bosses, non-player characters (NPCs), building materials, potions, etc. A character attribute may be any quality, trait, feature and/or characteristic a particular character can have. Character attributes may include, but are not be limited to: a character score, a virtual object, the physical appearance of a character, an emblem or mark, a synthetic voice, virtual currency, virtual help points or credits, the ability to join groups of other players at a later time, a score for subsequent matching of later game parameters, a relationship with another character, a genetic profile or makeup, a skill or skill level, and/or a ranking. Character skills may be game attributes inherent in or acquired by a player character during game play such as, but not limited to: the ability to cast (certain) spells, foretell the future, read minds, use (certain) weapons, cook, hunt, find herbs, assemble herbs into potions, mine, assemble objects into other objects, fly, and/or enchant other player characters.

The user maintains an inventory for the user's character in which virtual awards may be collected. The inventory may be accessed through an interface. As the character progresses through the game it may receive access to higher-level gear. Higher-level gear may be more powerful and/or effective within the game. This may include having parameters (e.g., hit points, attack strength, defense points, speed, etc.) that enhance the functionality of the gear in the game. The player may be able to review items within the player's inventory and equip the character with an item appropriate to the current game situation. Items may be dragged from the inventory to a preview window. As items are selected, they may appear either on or next to the character. For example, if the character is currently not wearing any armor and/or accessories, armor and accessories such as a cape may be added by accessing the character's inventory. Management of a character's inventory is a common game mechanic, and may lead to many hours of game play. Players may collect, trade, buy, fight over items, and/or perform other actions to add to their inventory. Games in different genres, such as science fiction, may incorporate items specific to that genre. For example, laser guns may be substituted in place of swords as the standard weapon used by characters within a science fiction-type game. The data describing clothing and other equipment or gear may be stored in the character record.

Players within the game may acquire virtual currency. In such games, the virtual currency might be represented by virtual coins, virtual cash, or by a number or value stored by the server for that player's benefit. Such virtual currency represents units of value for use in the online game system, and is analogous to legal currency. Virtual currency can be purchased in one or more actual cash or credit transactions by a player, where the legal currency is transferred using a credit/debit/charge card transaction conveyed over a financial network. A player may earn virtual currency by taking action in the game. For example, a player may be rewarded with one or more units of virtual currency after completing a task, quest, challenge, or mission within the game. For example, a farming game might reward 10 gold coins each time a virtual crop is harvested.

Virtual currency may be used to purchase one or more in-game assets or other benefits. For example, a player may be able to exchange virtual currency for a desired level, access, right, or item in an online game. In some implementations, legal currency can be used to directly purchase an in-game asset or other benefit. The player can select the desired in-game asset or other benefit. Once the necessary selections are made, the player can place the order to purchase the in-game asset or other benefit. This order is received by the game system, which can then process the order. If the order is processed successfully, an appropriate financial account associated with the player can be debited by the amount of virtual currency or legal currency needed to buy the selected in-game asset or other benefit.

Multiple types of virtual currency may be available for purchase from the game system operator. For example, an online game may have virtual gold coins and virtual cash. The different types of virtual currency may have different exchange rates with respect to legal currency and each other. For example, a player may be able to exchange $1 in legal currency for either 100 virtual gold coins or $2 in virtual cash, but virtual gold coins may not be exchanged for virtual cash. Similarly, where in-game assets and other benefits can be purchased with virtual currency, they may have different exchange rates with respect to the different types of virtual currency. For example, a player may be able to buy a virtual business object for $10 in virtual cash, but may not purchase the virtual business object for virtual gold coins alone. In some embodiments, certain types of virtual currency can be acquired by engaging in various in-game actions while other types of virtual currency can only be acquired by exchanging legal currency. For example, a player may be able to acquire virtual gold coins by selling virtual goods in a business, but can only acquire virtual cash by exchanging legal currency. Virtual cash may be awarded for leveling up in the game.

The user module 20 may be configured to manage user profiles including user information related to participating in a game through multiple modules. The user information may include user information for the first user that describes interaction of the first user with the game through the first platform and the second platform and/or any other platform. User information may be stored in user accounts and/or profiles. User accounts may be an account on a video game central server or within a peer-to-peer network that contains a user profile including personal, billing, and character account information. A user attribute may be any attribute that can be applied to a user account. User attributes may include, but not be limited to: real currency, discount of monthly fees for playing game, monthly fee for playing a game, interest rates for use of or borrowing real or virtual cash amounts, global character attribute settings for all characters created by player across multiple games, rewards for encouraging another player to sign up to play and/or any other attributes.

The interaction module may be configured to monitor interactions of the users with the game space and/or each other within the game space. This may include monitoring, for a given user, one or more of times at which the given user is logged in to the game space, areas of the game space the given user views or interacts with or in, other users the given user interacts with, the nature and/or content of interactions of the given user with other users, activities participated in within the game space, level, powers, or skill attained in the game space, inventory items obtained in the game space, and/or other interactions of the given user with the game space and/or other users. Some or all of the information generated by interaction module in monitoring the interactions of the users may be stored to the user profiles managed by user module 20.

At a given time, interaction module may determine a set of users that are currently engaged with the game space and/or a set of users that are currently not engaged with the game space. Being engaged with the game space may refer to being logged in to the game space, performing some action or interaction within the game space within some period of time (e.g., the last 2 minutes), and/or other taking some other action indicating ongoing and contemporaneous engagement with the game space.

The interaction module may be configured to determine, for individual users, an activity metric that indicates an activity level within the game space. The activity metric may be determined based on one or more of log in frequency, amount of time logged in to the game space within a rolling time period (e.g., over the last day, week, month, or other rolling time period), average amount of time logged in to the game space over some length of time (e.g., per day, per week, and/or other length of time), average log in session time over a rolling time period, number of inter-user communications over a length of time, number of inter-user communications per log in, number of relationships with other users in the game space, number of new relationships with other users in the game space within a rolling time period, amount of real world money spent in the game space, and/or other activity parameters.

A store module may be configured to present a store interface to the users. The store interface may present offers to users to buy item instances of virtual items. The virtual items may include a first virtual item and/or any other item. A virtual item may be an item that can be used in the game instance by the user. For example, a virtual item may be used to assist a player's character, and/or in other ways. Examples of virtual items include, but are not limited to, resources, currency, valuables (money, valuable metals or gems, etc.), weapons, spell components, defense components, armor, mounts, pets, attire, power ups, and/or other items.

A store module may be configured to effectuate presentation to the users of offers to purchase resources. The offers may include a first offer for the first user to purchase a first set of one or more virtual items. The virtual items may include a virtual good, a virtual currency, and/or other virtual items as described above. For example, the store module may be configured such that the offers presented to the first user may be restricted to offers having prices in a first price range. The first price range may be determined based on the user metric for the first user, and/or the user metric for other users. The store module may be configured such that the first price range may change as participation by the first user in the game causes the user metric for the first user to change. The store module may be configured such that the first price range may be bounded by one or more both of a minimum value and/or a maximum value. The store module may be configured such that the offers having prices below the minimum value may not be available for purchase by the first user. The store module may be configured such that offers having prices above the maximum value may be locked. This may mean the offers having prices above the maximum value may be unavailable for purchase by the first user independent from whether the first user has consideration sufficient to purchase such offers. Such offers may become unlocked as the maximum value of the price range is adjusted above the prices of such offers.

For example, players' experience with pricing of in-game goods may be associated with their progress in the game. In some implementations, the higher the level of the player, the lower the in-game goods may cost. Depending on the level of the player, the goods available to the player may change. Overall, the more the player advances in the game, new items may be unlocked to the player for purchase. Goods previously provided to the player for purchase may or may not be accessible to the player depending on the player's level.

A user valuation module 22 may be configured to determine user value metrics for the users on the individual platforms. The user valuation module 22 may determine a first user value metric for the first user on the first platform and a second user value metric for the first user on the second platform based on the user information stored in the user profiles.

The user valuation module 22 may be configured to determine the user value metrics of the user on the various platforms through which the user may access the game. The metrics may include the first user value metric and the second user value metric and/or any other metric. The user valuation module may determine the user value metrics based on the past user spending and/or any other type of spending by the users on the platforms. The past user spending may comprise one or more of: virtual currency and real world currency and/or any other type of currency. The user valuation module may be configured such that the amount of the past user spending in the game may be monitored by one or more of: a spend velocity, a spend frequency, a total amount spent, conversion rates of the different platforms, monetization through ads on the different platforms, and/or other variables in addition to in game spending that impact value to the game provider.

The user metric may quantify one or more of a progress within the game, a power level within the game, a skill level within the game, a level of virtual technology advancement within the game, success within the game as a whole or within certain types of gameplay (e.g., player-versus-player gameplay, player-versus-environment gameplay, harvesting gameplay, and/or other gameplay types), and/or other aspects. A metric can be classified as a status metric or a predictive metric. A status metric characterizes behavioral information of a set of on-line entities where the behavioral information is related to at least one activity of the on-line entities within the persistent virtual environment. Example status metrics include, without limitation, a prominence metric, a centrality degree metric, a cohesive subgroup metric, a group level equivalence metric, a leadership metric, a strength of ties metric, an interactivity metric, a topic of interaction metric, a role metric, a social accounting metric, a game-play metric, a modeling metric, and an interaction topic metric as well as other metrics. These metrics are subsequently briefly described.

A predictive metric can, for example, evaluate the change in a status metric over time. Example predictive metrics include, without limitation: a churn metric, compatibility metric, a scheduling metric, a content consumption metric, an environmental balance metric, a survival metric, and an economic metric. Churn metrics predict the probability of a user leaving the persistent virtual environment, based on the user's past interaction patterns. Compatibility metrics indicate whether or not a user's play style will match a proposed player association or whether the user's play style matches that of the user association to which he/she is a member. Scheduling metrics predict the probability of a player being available for a future joint activity, so that such activities can be planned in advance. Content consumption metrics predict when users will have exhausted the persistent virtual environment's resources, in order to plan timely expansions to the persistent virtual environment. Environmental balance metrics predict the effects of a design change on the persistent virtual environment, such as removing a given "profession" or certain items from the persistent virtual environment. Economic metrics predict inflation, trade volume, and other variables in order to maintain the balance of trade in the persistent virtual environment. The survival metric indicates the health of a user association.

The predictive metrics can include those that develop a time-series of single or combinations of status metrics (weighted or un-weighted) that represent trends; metrics that represent heuristically determined conditions relevant to the predicted health of the persistent virtual environment; metrics based on a vector of attributes representing characteristics of the on-line entity such that the vectors can be used to classify on-line entities and to determine the characteristics of successful on-line entities; and to determine whether on-line entities have characteristics that are progressing toward or away from the characteristics of successful online entities.

The classification of the on-line entities can utilize a Bayesian network, spectral analysis, nearest neighbor techniques or any other classification mechanism.

The predictive metrics can timely measure the social aspects of user interactions in the persistent virtual environment, and measure and/or monitor the health of the online user community in a persistent virtual environment. By using the predictive metrics, the MMOG provider can alter the persistent virtual environment to encourage desired social interactions and to discourage less desired social interactions.

A reward module 24 may be configured to provide virtual rewards to users in the game responsive to users participating in or completing activities. The activities may include a first activity and/or any other activity. The reward module 24 may determine responsive to the first user completing the first activity, a reward to provide the users based on the platform through which the user is accessing the game to perform the first activity and/or any other activity. The reward module 24 may be configured to determine if the user completes the activities comprising one or more of: tasks in the game, logging into the game, interacting with other users in the game, inviting other people to join the game and/or activities.

The reward module 24 may create an incentive for users to play on more than one platform. Many times users usually play games only one platform and the information about the user's habits is usually limited to that singular platform. By creating a mechanism to provide rewards to users outside the single platform, users will be incentivized to play on different game platforms. While users play on different game platforms, game administrators may monitor different types of user habits and behavior.

The user habits and behavior may include spend behavior and user engagement all based on user input through each console. This will allow a game administrator to gain a better understanding of user habits and overall behavior. A user's habits and behavior may be captured not only when the user is traveling through their phone, but also when they are at home on their PC, when they are on their office PC, and/or when they are on their home console and/or any other platform.

Network module 26 of the game server(s) 12 may be configured to maintain a connection to the one or more client computing platforms 14. For example, the network module 26 may maintain one or more communication lines or ports to enable connection and/or exchange of information with a network 30 and/or other computing platforms 14. Information such as state information, game state and game logic may be communicated via network module. The network module 26 may be configured to receive information from the client computing platform(s) 14 as well.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

The game server(s) 12, client computing platform(s) 14, and/or external resource(s) 32 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which game server(s) 12, client computing platform(s) 14, and/or external resource(s) 32 may be operatively linked via some other communication media.

Game server(s) 12 may include electronic storage 28, one or more processors 16, and/or other components. Game server(s) 12 may include communication lines, or ports to enable the exchange of information with a network 30 and/or other computing platforms 14. Illustration of game server(s) 12 in FIG. 1 is not intended to be limiting. Game server(s) 12 may include a plurality of hardware, software, and/or firmware components operating together to provide the functionality attributed herein to game server(s) 12. For example, game server(s) 12 may be implemented by a cloud of computing platforms operating together as game server(s) 12.

Electronic storage 28 may comprise non-transitory storage media that electronically stores information. The electronic storage media of electronic storage 28 may include one or both of system storage that is provided integrally (i.e., substantially non-removable) with game server(s) 12 and/or removable storage that is removably connectable to game server(s) 12 via, for example, a port (e.g., a USB port, a firewire port, etc.) or a drive (e.g., a disk drive, etc.). Electronic storage 28 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 28 may include one or more virtual storage resources (e.g., cloud storage, a virtual private network, and/or other virtual storage resources). Electronic storage 28 may store software algorithms, information determined by processor 16, information received from game server(s) 12, information received from client computing platform(s) 14, and/or other information that enables game server(s) 12 to function as described herein.

Processor(s) 16 is configured to provide information processing capabilities in game server(s) 12. As such, processor(s) 16 may include one or more of a digital processor, an analog processor, a digital circuit designed to process information, an analog circuit designed to process information, a state machine, and/or other mechanisms for electronically processing information. Although processor(s) 16 is shown in FIG. 1 as a single entity, this is for illustrative purposes only. In some implementations, processor(s) 16 may include a plurality of processing units. These processing units may be physically located within the same device, or processor(s) 16 may represent processing functionality of a plurality of devices operating in coordination. The processor(s) 16 may be configured to execute modules 18, 20, 22, 24 and/or 26. Processor(s) 16 may be configured to execute modules 18, 20, 22, 24 and/or 26 by software; hardware; firmware; some combination of software, hardware, and/or firmware; and/or other mechanisms for configuring processing capabilities on processor(s) 16. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 18, 20, 22, 24 and/or 26 are illustrated in FIG. 1 as being implemented within a single processing unit, in implementations in which processor includes multiple processing units, one or more of modules 18, 20, 22, 24 and/or 26 may be implemented remotely from the other modules. The description of the functionality provided by the different modules 18, 20, 22, 24 and/or 26 described below is for illustrative purposes, and is not intended to be limiting, as any of modules 18, 20, 22, 24 and/or 26 may provide more or less functionality than is described. For example, one or more of modules 18, 20, 22, 24 and/or 26 may be eliminated, and some or all of its functionality may be provided by other ones of modules 18, 20, 22, 24 and/or 26. As another example, processor 16 may be configured to execute one or more additional modules that may perform some or all of the functionality attributed below to one of modules 18, 20, 22, 24 and/or 26.

A given client computing platform(s) 14 may include one or more processors configured to execute computer program modules. The computer program modules may be configured to enable an expert or user associated with the given client computing platform(s) 14 to interface with system 10, game server(s) 12, and/or external resource(s) 32, and/or provide other functionality attributed herein to client computing platform(s) 14. By way of non-limiting example, the given client computing platform(s) 14 may include one or more of a desktop computer, a laptop computer, a handheld computer, a tablet computing platform, a NetBook, a Smartphone, a gaming console, and/or other computing platforms.

External resource(s) 32 may include sources of information, hosts and/or providers of game space s outside of system 10, external entities participating with system 10, and/or other resources. In some implementations, some or all of the functionality attributed herein to external resource(s) 32 may be provided by resources included in system 10.

Figure 2:
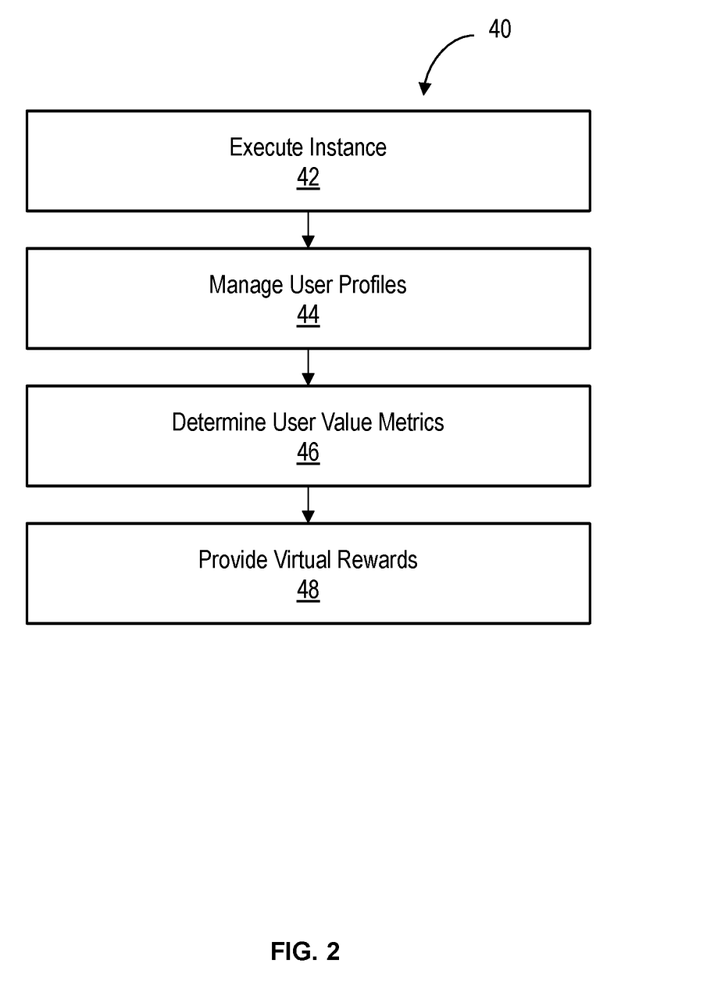
FIG. 2 illustrates an exemplary method of implementing dynamically adjusting prizes or awards based on a platform an online game, according to an aspect of the invention.

FIG. 2 illustrates a method 40 configured to implement an exemplary method of dynamically adjusting prizes or awards based on a platform an online game, according to an aspect of the invention. The operations of method 40 presented below are intended to be illustrative. In some embodiments, method 40 may be accomplished with one or more other operations not described, and/or without one or more of the operations discussed. The order in which the operations of method 40 are illustrated in FIG. 2 and described below is not intended to be limiting.

In some embodiments, method 40 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 40 in response to instructions stored electronically on an electronic storage medium. The one or more processing devices may include one or more devices configured through hardware, firmware, and/or software to be specifically designed for execution of one or more of the operations of method 40.

At an operation 42, an instance of a game space may be executed. In some implementations, operation 42 may be performed by a game module the same as or similar to game module 18 (shown in FIG. 1 and described above).

At an operation 44, the executed instance of the game space may be implemented to manage user profiles. The user information may include user information for the first user that describes interaction of the first user with the game through the first platform and the second platform and/or any other platform. User information may be stored in user accounts and/or profiles. User accounts may be an account on a video game central server or within a peer-to-peer network that contains a user profile including personal, billing, and character account information. A user attribute may be any attribute that can be applied to a user account. User attributes may include, but not be limited to: real currency, discount of monthly fees for playing game, monthly fee for playing a game, interest rates for use of or borrowing real or virtual cash amounts, global character attribute settings for all characters created by player across multiple games, rewards for encouraging another player to sign up to play and/or any other attributes. In some implementations, operation 44 may be performed by a user module the same as or similar to user module 20 (shown in FIG. 1 and described above).

At an operation 46, user value metrics may be determined. The user valuation information may include user value metrics for the users on the individual platforms. In some implementations, operation 46 may be performed by a user valuation module the same as or similar to user valuation module 22 (shown in FIG. 1 and described above).

At an operation 48, the virtual rewards may be provided. The virtual rewards may be provided to users in the game in response to users participating in or completing activities. In some implementations, operation 48 may be performed by a reward module the same as or similar to the reward module 24 (shown in FIG. 1 and described above).

Figure 3:
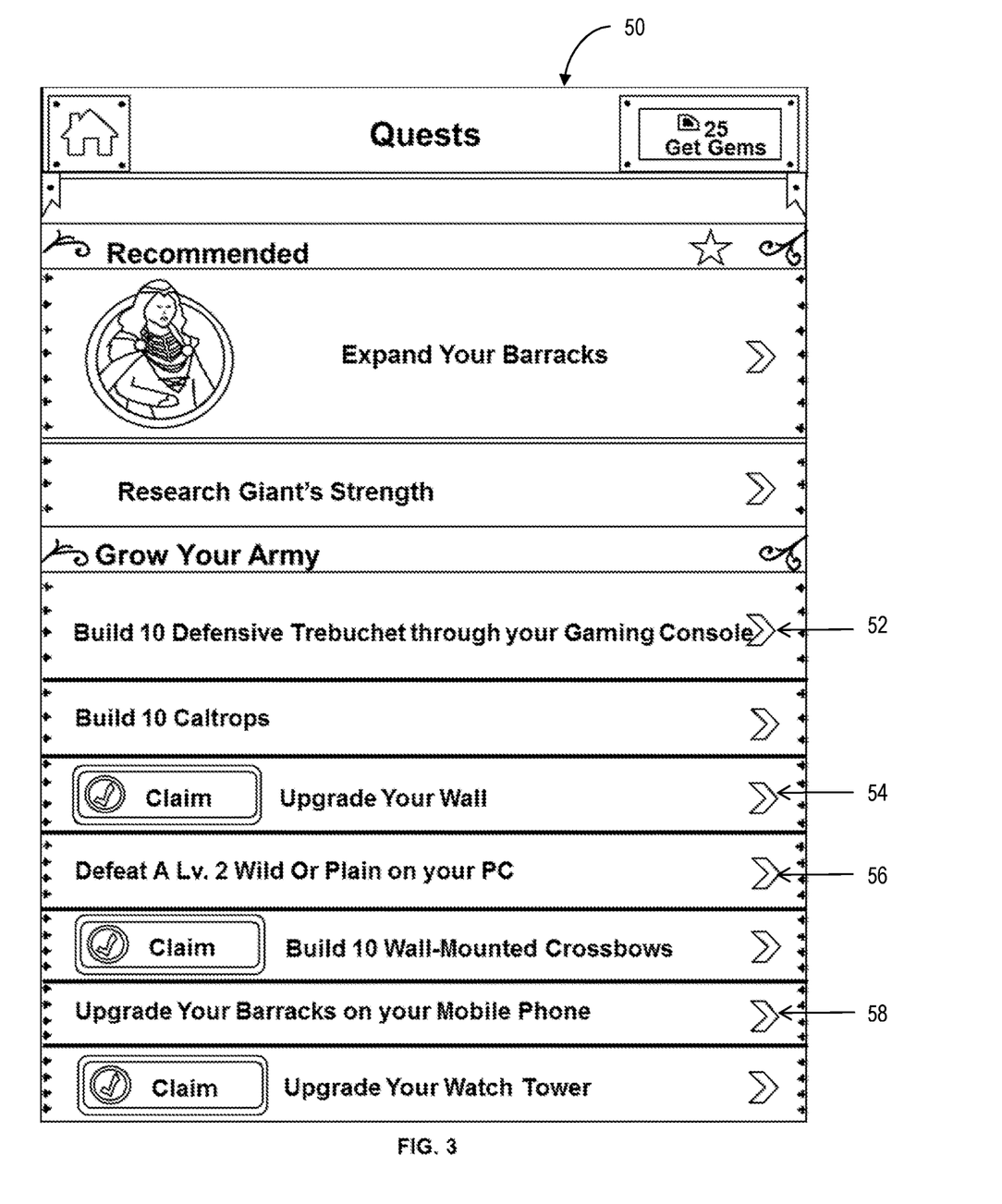
FIG. 3 illustrates an exemplary diagram of a user interface which implements dynamically adjusting prizes or awards based on a platform in an online game, according to an aspect of the invention.

FIG. 3 illustrates an exemplary diagram of a user interface 50 which implements dynamically adjusting prizes or awards based on a platform in an online game, according to an aspect of the invention. As shown, the user interface 50 enables a user to determine which rewards will be provided based on particular console. The user may be required to complete a particular task on a particular platform as exemplified by 52, 56 and 58. Once the user completes the task, the user may claim their accomplishment by selecting item 54.

Tasks shall include, but not be limited to: completing all or part of a mission; playing for a certain period of time; winning a match against another player character or computer generated character; reaching a certain level or score; using or obtaining an ability or technology; kill/death ratios; obtaining, creating or modifying an object; solving a puzzle; accuracy with weapons; effective use of the proper weapon; killing a certain character/creature; getting through or to a certain geographic area; decreasing or increasing Karma Points; getting, buying, exchanging or learning a new skill or player attribute; having a child; getting married; obtaining, buying, trading, producing or developing raw materials; producing goods or services; earning income; earning a higher rank in an army; winning an election among two or more player characters; achieving deity or other status; improving player character status or caste; assisting other player characters with any of the above; speed of accomplishing or changing the rate or trends of any or all of the above.

Accomplishments shall include acquiring various matters. Various matters may be collected in an inventory. These matters may include, but are not limited to, virtual items, virtual resources, character attributes, and/or character skills. A virtual item may be an item that can be used in a virtual world to assist a player's character. Examples of virtual items include, but are not limited to, valuables (money, valuable metals or gems, etc.), weapons, spell components, defense components, and/or armor. A virtual resource may be a resource that can be used in the virtual world to create game attributes. Examples of virtual resources include wood, stone, herbs, water, ores, animals, monsters, bosses, NPCs, building materials, potions, etc. A character attribute may be any quality, trait, feature and/or characteristic a particular character can have. Character attributes may include, but not be limited to: a character score, a virtual object, the physical appearance of a character, an emblem or mark, a synthetic voice, virtual currency, virtual help points or credits, the ability to join groups of other players at a later time, a score for subsequent matching of later game parameters, a relationship with another character, a genetic profile or makeup, a skill or skill level, and/or a ranking. Character skills may be game attributes inherent in or acquired by a player character during game play such as, but not limited to: the ability to cast (certain) spells, foretell the future, read minds, use (certain) weapons, cook, hunt, find herbs, assemble herbs into potions, mine, assemble objects into other objects, fly, and/or enchant other player characters.

The user maintains an inventory for the user's character in which virtual awards may be collected. The inventory may be accessed through an interface. As the character progresses through the game it may receive access to higher-level gear. Higher-level gear may be more powerful and/or effective within the game. This may include having parameters (e.g., hit points, attack strength, defense points, speed, etc.) that enhance the functionality of the gear in the game. The player may be able to review items within the player's inventory and equip the character with an item appropriate to the current game situation. Items may be dragged from the inventory to a preview window. As items are selected, they may appear either on or next to the character. For example, if the character is currently not wearing any armor and/or accessories, armor and accessories such as a cape may be added by accessing the character's inventory. Management of a character's inventory is a common game mechanic, and may lead to many hours of game play. Players may collect, trade, buy, fight over items, and/or perform other actions to add to their inventory. Games in different genres, such as science fiction, may incorporate items specific to that genre. For example, laser guns may be substituted in place of swords as the standard weapon used by characters within a science fiction-type game. The data describing clothing and other equipment or gear may be stored in the character record.

Figure 4:
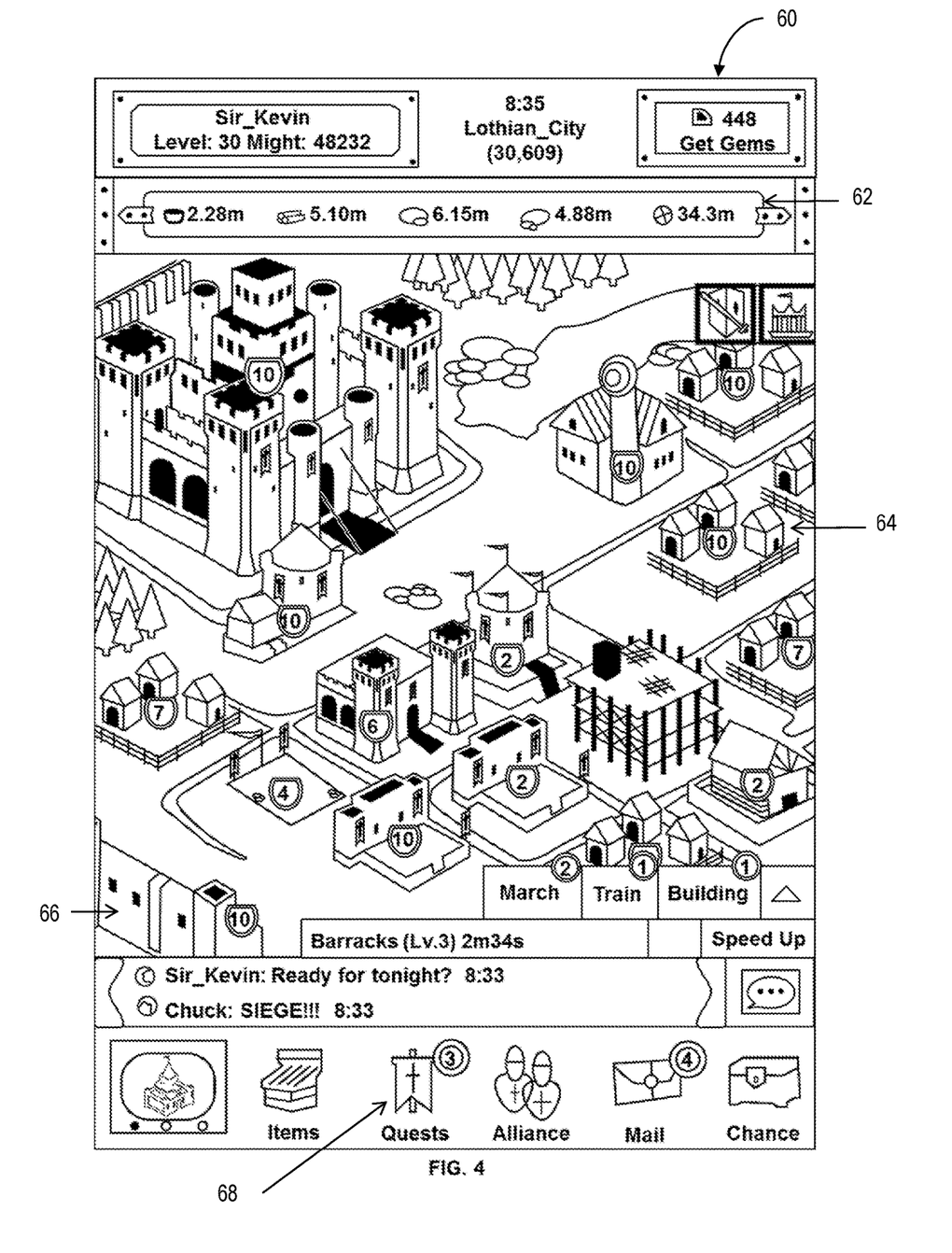
FIG. 4 illustrates an exemplary diagram of a user interface which implements dynamically adjusting prizes or awards based on a platform in an online game, according to an aspect of the invention.

FIG. 4 illustrates an exemplary diagram of a user interface 60 which implements dynamically adjusting prizes or awards based on a platform in an online game, according to an aspect of the invention. As shown, the user interface 60 enables a user to determine how many virtual items the user has acquired 62. The user interface 60 enables a user to choose which task to complete. For example, a user may choose to upgrade cottages 64 or upgrade the kingdom wall 66. The user interface 60 allows a user to see what tasks need completing 68.

Figure 5:
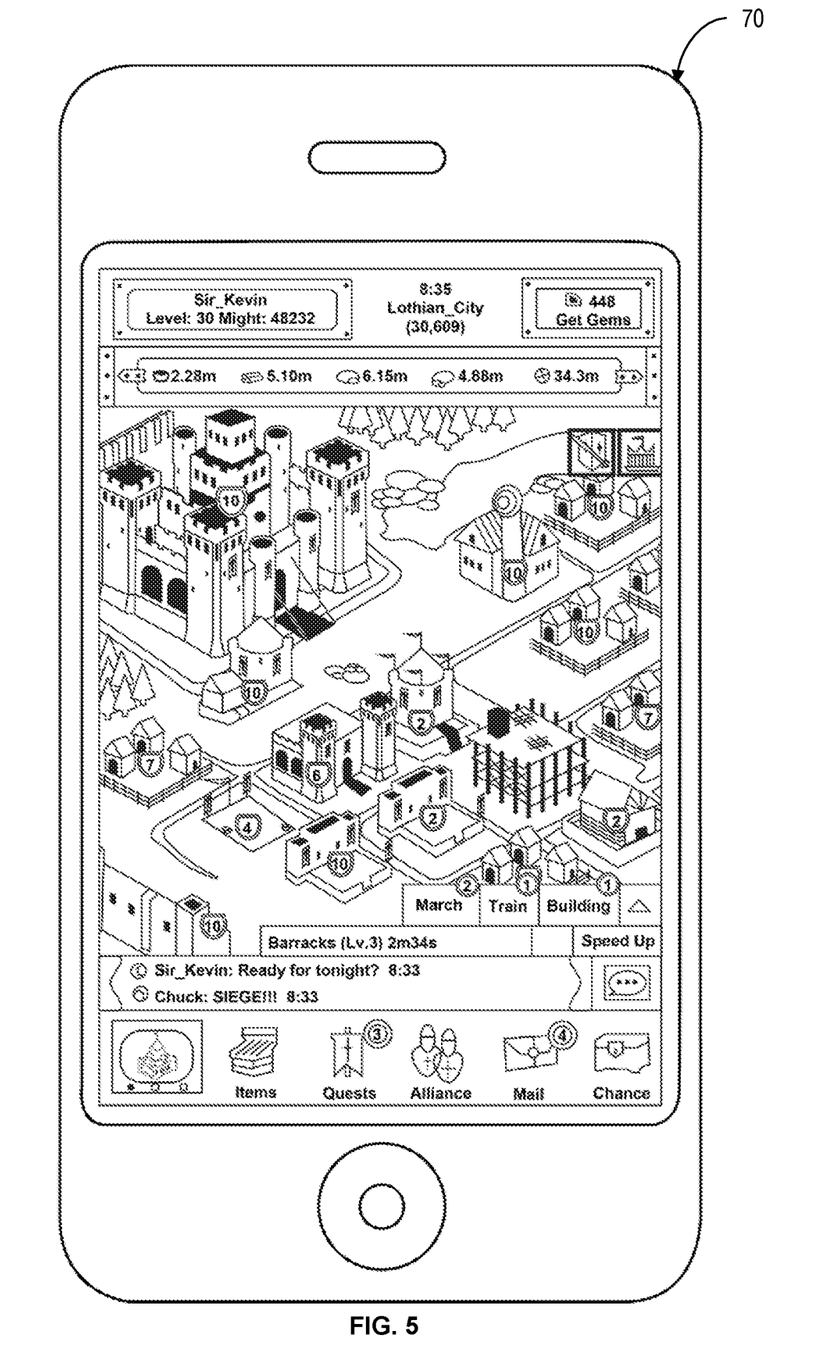
FIG. 5 illustrates an exemplary diagram of a user interface which implements dynamically adjusting prizes or awards based on a platform in an online game, according to an aspect of the invention.

FIG. 5 illustrates an exemplary diagram of a user interface 70 which implements dynamically adjusting prizes or awards based on a platform in an online game, according to an aspect of the invention. In some implementations, the platform may be a mobile phone.

Figure 6:
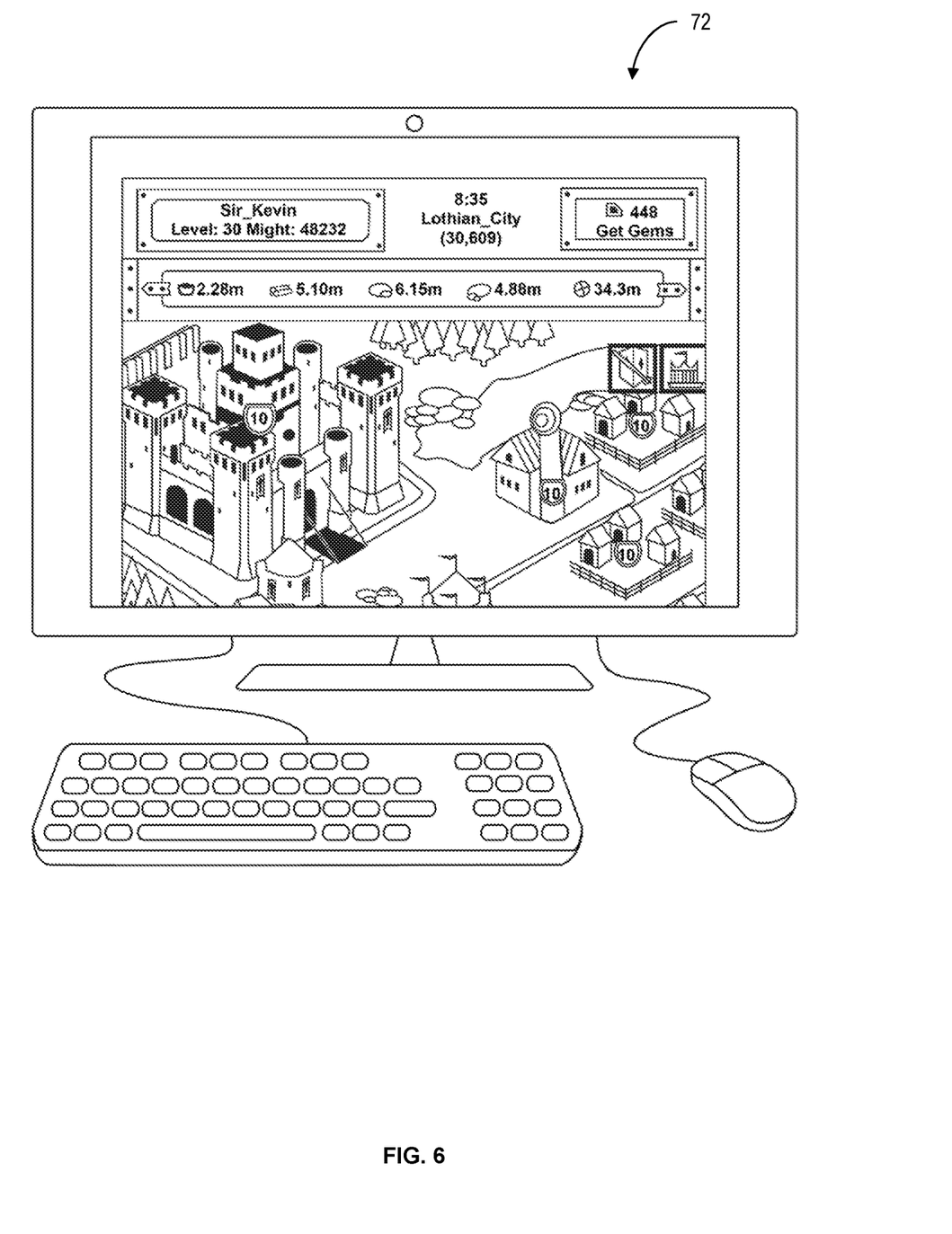
FIG. 6 illustrates an exemplary diagram of a user interface which implements dynamically adjusting prizes or awards based on a platform in an online game, according to an aspect of the invention.

FIG. 6 illustrates an exemplary diagram of a user interface 72 which implements dynamically adjusting prizes or awards based on a platform in an online game, according to an aspect of the invention. In some implementations, the platform may be a personal computer.

Figure 7:
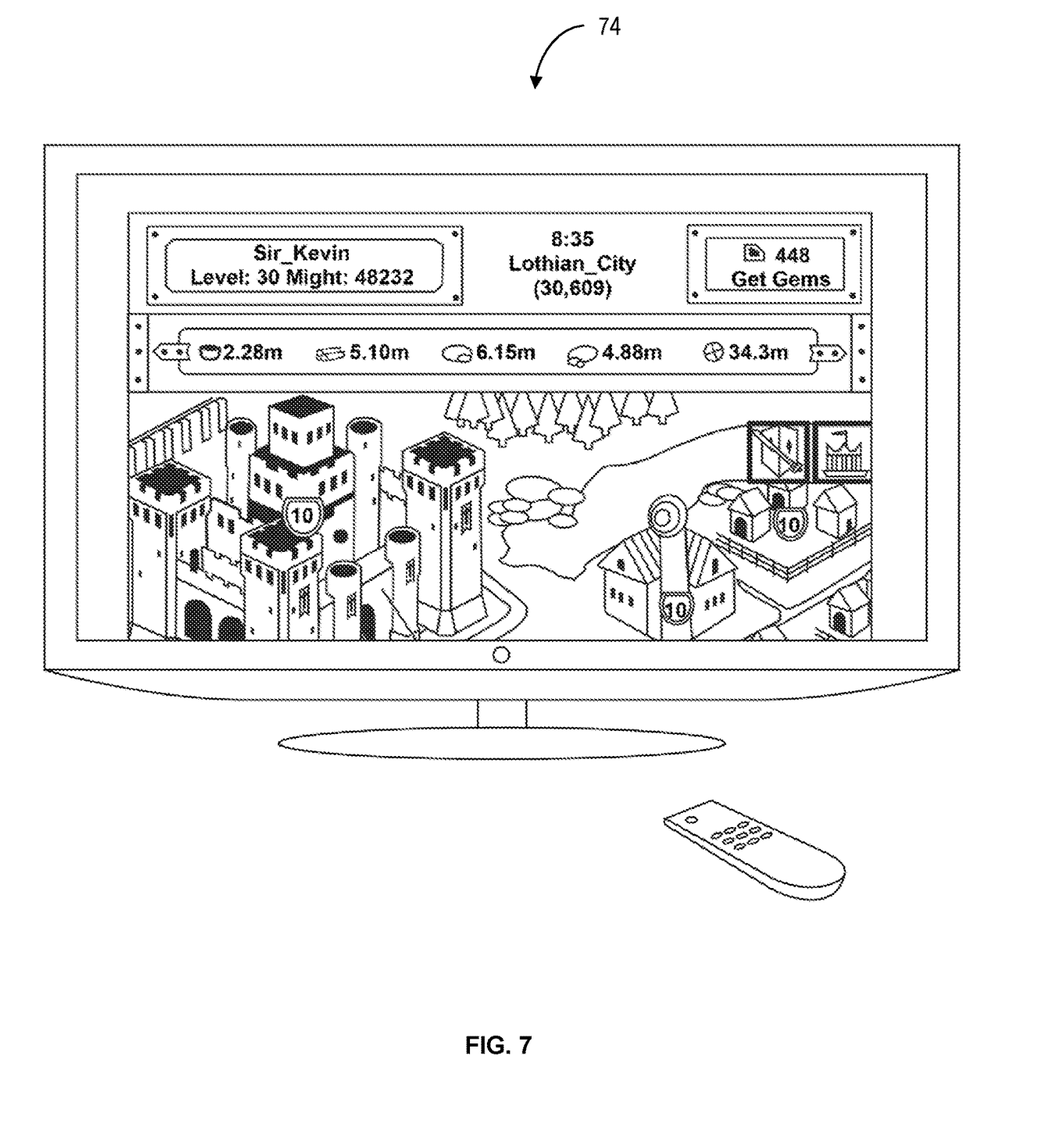
FIG. 7 illustrates an exemplary diagram of a user interface which implements dynamically adjusting prizes or awards based on a platform in an online game, according to an aspect of the invention.

FIG. 7 illustrates an exemplary diagram of a user interface 74 which implements dynamically adjusting prizes or awards based on a platform in an online game, according to an aspect of the invention. In some implementations, the platform may be a smart television 74.

Figure 8:
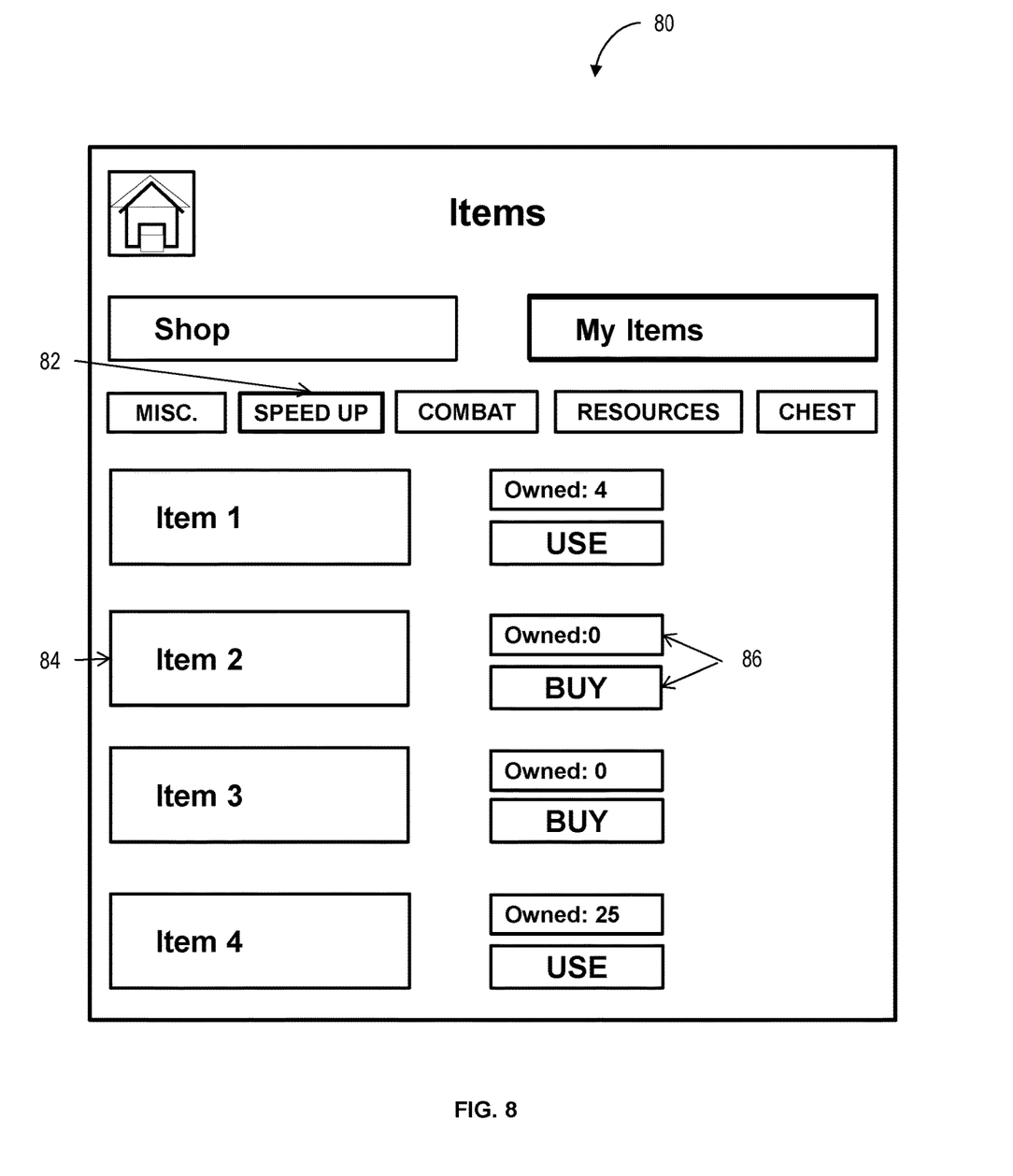
FIG. 8 illustrates an exemplary diagram of a user interface which implements dynamically adjusting prizes or awards based on a platform in an online game, according to an aspect of the invention.

FIG. 8 illustrates an exemplary diagram of a user interface 80 which implements dynamically adjusting prizes or awards based on a platform in an online game, according to an aspect of the invention. In some implementations, the user may select the "my items" tab, and select from a category 82 of virtual in-game goods to use in game. In some implementations, the categories may include one or more: miscellaneous, speed up, combat, resources, chest, and/or any other category. Each category contains lists of items 84 that a user owns and/or may use or purchase 86 in game.

It would be understood by one of ordinary skill in the art that the interfaces may not be limited to the embodiment illustrated in FIGS. 3, 4, 5, 6, 7, and 8. The interfaces may be associated with any objective, activity, action, or a combination thereof.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for providing content to a first user based on selections by the first user, wherein the content is related to at least one of multiple platforms, wherein the multiple platforms include a first platform and a second platform through which the first user can participate in an online game, the system comprising:
one or more processors configured by machine-readable instructions to:
obtain information that indicates a particular user condition of the first user;
present options to the first user for a selection of either a first item of content or a second item of content, wherein
(i) the first item of content, upon the selection by the first user, will be received through the first platform, and
(ii) the second item of content, upon the selection by the first user, will be received through the second platform;
responsive to the selection of the first item of content, provide the first item of content to the first user through the first platform; and
responsive to the selection of the second item of content, provide the second item of content to the first user through the second platform.

2. The system of claim 1, wherein the first item of content is different from the second item of content.

3. The system of claim 1, wherein the one or more processors are further configured by machine-readable instructions to obtain user value metrics for the users for individual platforms used to access the online game, such that a first user value metric for the first user on the first platform and a second user value metric for the first user on the second platform are obtained.

4. The system of claim 3, wherein the one or more processors are further configured by machine-readable instructions to determine the first user value metric and the second user value metric, wherein the first item of content is based on the first user value metric, and wherein the second item of content is based on the second user value metric.

5. The system of claim 3, wherein the user value metrics indicate past user spending by the users on the multiple platforms.

6. The system of claim 5, wherein the past user spending comprises one or more of virtual currency and/or real-world currency, and wherein the past user spending in the online game is indicated by one or more of a spend velocity, a spend frequency, and/or a total amount spent.

7. The system of claim 1, wherein first participation in the online game through the first platform includes accessing the first platform through a first website, wherein second participation in the online game through the second platform includes accessing the second platform through a second website, and wherein the first website is different from the second website.

8. The system of claim 1, wherein the particular user condition includes one or more of a skill level related to the first user, a ranking for the first user in the online game, a level of progress by the first user in the online game, and/or a level of health related to the first user in the online game.

9. The system of claim 1, wherein the first item of content includes a first virtual item that can be used in the online game, and wherein the second item of content includes a second virtual item that can be used in the online game.

10. The system of claim 1, wherein the one or more processors are further configured by machine-readable instructions to:
monitor whether the particular user condition occurs within the online game,
wherein the options are presented subsequent to the information being obtained.

11. A computer implemented method for providing content to a first user based on selections by the first user, wherein the content is related to at least one of multiple platforms, wherein the multiple platforms include a first platform and a second platform through which the first user can participate in an online game, the method comprising:
obtaining information that indicates a particular user condition of the first user;
presenting options to the first user for a selection of either a first item of content or a second item of content, wherein:
(i) the first item of content, upon the selection by the first user, will be received through the first platform, and
(ii) the second item of content, upon the selection by the first user, will be received through the second platform;
responsive to the selection of the first item of content, providing the first item of content to the first user through the first platform; and
responsive to the selection of the second item of content, providing the second item of content to the first user through the second platform.

12. The method of claim 11, wherein the first item of content is different from the second item of content.

13. The method of claim 11, further comprising:
obtaining user value metrics for the users for individual platforms used to access the online game, such that a first user value metric for the first user on the first platform and a second user value metric for the first user on the second platform are obtained.

14. The method of claim 13, further comprising:
determining the first user value metric and the second user value metric, wherein the first item of content is based on the first user value metric, and wherein the second item of content is based on the second user value metric.

15. The method of claim 13, wherein the user value metrics are determined based on past user spending by the users on the multiple platforms.

16. The method of claim 15, wherein the past user spending comprises one or more of virtual currency and/or real-world currency, and wherein the past user spending in the online game is indicated by one or more of a spend velocity, a spend frequency, and/or a total amount spent.

17. The method of claim 11, further comprising:
facilitating participation in the online game to the first user through the multiple platforms,
wherein the participation in the online game through the first platform includes accessing the first platform through a first website, wherein the participation in the online game through the second platform includes accessing the second platform through a second website, and wherein the first website is different from the second website.

18. The method of claim 11, wherein the particular user condition includes one or more of a skill level related to the first user, a ranking for the first user in the online game, a level of progress by the first user in the online game, and/or a level of health related to the first user in the online game.

19. The method of claim 11, wherein the first item of content includes a first virtual item that can be used in the online game, and wherein the second item of content includes a second virtual item that can be used in the online game.

20. The method of claim 11, further comprising:
monitoring whether the particular user condition occurs within the online game,
wherein the options are presented subsequent to obtaining the information.

* * * * *